United States Patent
Mukherjee et al.

(10) Patent No.: US 11,729,814 B2
(45) Date of Patent: *Aug. 15, 2023

(54) CHANNEL ACCESS CONFIGURATION

(71) Applicant: Telefonaktiebolaget LM Ericsson (publ), Stockholm (SE)

(72) Inventors: Amitav Mukherjee, Fremont, CA (US); Jung-Fu Cheng, Fremont, CA (US); Sorour Falahati, Stockholm (SE); Laetitia Falconetti, Aachen (DE); Havish Koorapaty, Saratoga, CA (US); Daniel Larsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 81 days.

This patent is subject to a terminal disclaimer.

(21) Appl. No.: 17/340,252

(22) Filed: Jun. 7, 2021

(65) Prior Publication Data

US 2021/0298067 A1 Sep. 23, 2021

Related U.S. Application Data

(63) Continuation of application No. 15/316,565, filed as application No. PCT/SE2016/050751 on Aug. 12, 2016, now Pat. No. 11,057,928.

(Continued)

(51) Int. Cl.
*H04W 74/00* (2009.01)
*H04W 74/04* (2009.01)
(Continued)

(52) U.S. Cl.
CPC ....... *H04W 74/004* (2013.01); *H04W 74/006* (2013.01); *H04W 74/04* (2013.01); *H04W 74/02* (2013.01); *H04W 74/0808* (2013.01)

(58) Field of Classification Search
CPC . H04W 74/004; H04W 74/006; H04W 74/04; H04W 74/02; H04W 74/0808
See application file for complete search history.

(56) References Cited

U.S. PATENT DOCUMENTS

| 11,057,928 B2* | 7/2021 | Mukherjee .......... H04W 74/006 |
| 2010/0034091 A1 | 2/2010 | Hiertz et al. |

(Continued)

FOREIGN PATENT DOCUMENTS

| CN | 104333873 A | 2/2015 |
| CN | 104581908 A | 4/2015 |

(Continued)

OTHER PUBLICATIONS

3GPP, "3rd Generation Partnership Project; Technical Specification Group Radio Access Network; Evolved Universal Terrestrial Radio Access (E-UTRA); Physical channels and modulation (Release 11)", 3GPP TS 36.211 V11.4.0 (Sep. 2013), Sep. 2013, pp. 1-120.

(Continued)

*Primary Examiner* — Abdullahi Ahmed
(74) *Attorney, Agent, or Firm* — Murphy, Bilak & Homiller, PLLC

(57) ABSTRACT

Embodiments herein relate to a method performed by a scheduling node for scheduling an uplink transmission from a wireless device to the scheduling node, which wireless device is connected to a Primary Cell, Pcell, of the scheduling node in a licensed or unlicensed frequency band, and wherein the wireless device is also connected to at least one Secondary Cell, SCell, in an unlicensed frequency band. The scheduling node determines at least one Listen Before Talk, LBT, parameter associated with an LBT procedure and informs the wireless device about the determined at least one LBT parameter in a scheduling grant of the uplink transmission.

18 Claims, 9 Drawing Sheets

Related U.S. Application Data

(60) Provisional application No. 62/205,024, filed on Aug. 14, 2015.

(51) Int. Cl.
*H04W 74/08* (2009.01)
*H04W 74/02* (2009.01)

(56) References Cited

U.S. PATENT DOCUMENTS

| | | |
|---|---|---|
| 2012/0230205 A1 | 9/2012 | An et al. |
| 2014/0307653 A1* | 10/2014 | Liu ............... H04B 7/2612 370/329 |
| 2014/0362780 A1* | 12/2014 | Malladi .......... H04W 74/0808 370/329 |
| 2015/0016437 A1 | 1/2015 | Wentink |
| 2015/0063189 A1 | 3/2015 | Merlin et al. |
| 2015/0365880 A1* | 12/2015 | Malladi ............. H04W 48/12 370/312 |
| 2017/0019909 A1 | 1/2017 | Si et al. |
| 2017/0034831 A1 | 2/2017 | Yerramalli et al. |
| 2017/0339588 A1 | 11/2017 | Moon et al. |
| 2018/0020485 A1 | 1/2018 | Yang et al. |
| 2018/0049241 A1* | 2/2018 | Heo ............... H04W 74/0808 |
| 2018/0084432 A1 | 3/2018 | Kwak et al. |
| 2018/0192442 A1 | 7/2018 | Li et al. |
| 2018/0213563 A1 | 7/2018 | Yang et al. |
| 2018/0263054 A1 | 9/2018 | Wang et al. |

FOREIGN PATENT DOCUMENTS

| | | |
|---|---|---|
| RU | 2378800 C2 | 1/2010 |
| RU | 2385540 C2 | 3/2010 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.4.0 (Sep. 2013), Sep. 2013, pp. 1-182.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0 (Sep. 2013), Sep. 2013, pp. 1-347.

Hiertz, Guido R., et al., "The evolution of wireless LANs and PANs—Analysis of IEEE 802.11 E for QoS support in wireless LANs", IEEE Wireless Communications, vol. 10, No. 6, Dec. 2003, pp. 40-50.

Mangold, et al., "Analysis of IEEE 802.11E for QoS Support in Wireless LANs", IEEE Wireless Communications, Dec. 2003, pp. 40-50.

"LBT Impacts on High Layers for LAA", 3GPP TSG-RAN WG2 meeting #90, R2-152327, ZTE Corp, Fukuoka, Japan, May 25-29, 2015, pp. 1-3.

* cited by examiner

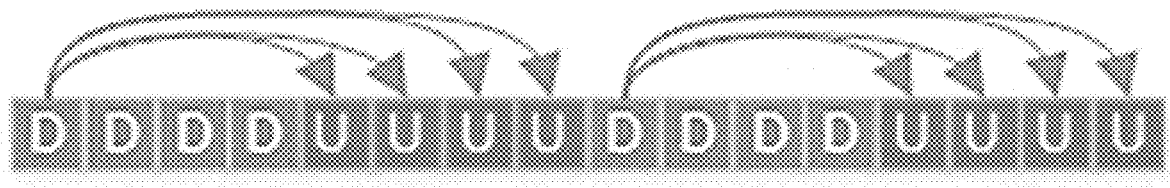
Fig. 8
Fig. 9
No DL data
in buffer
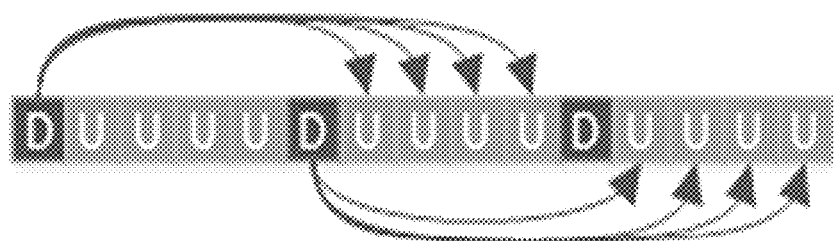
DL data
in buffer
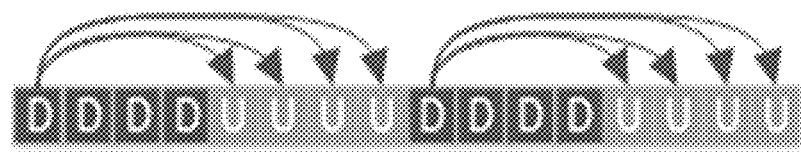
Fig. 10

| Attempt k | 0 | 1 | 2 | 3 | 4 |
|---|---|---|---|---|---|
| CWs(k) | 4 | 8 | 16 | 32 | 32 |

Fig. 11a (Table 1)

| Attempt k | 0 | 1 | 2 | 3 | 4 | 5 | 6 | 7 |
|---|---|---|---|---|---|---|---|---|
| CWs(k) | 16 | 32 | 64 | 128 | 256 | 512 | 1024 | 1024 |

Fig. 11b (Table 2)

CHANNEL ACCESS CONFIGURATION

RELATED APPLICATIONS

This application is a continuation of U.S. application Ser. No. 15/316,565 filed 6 Dec. 2016, which is a U.S. National Phase Application of PCT/SE2016/050751 filed 12 Aug. 2016, which claims benefit of Provisional Application No. 62/205,024 filed 14 Aug. 2015. The entire contents of each aforementioned application is incorporated herein by reference.

TECHNICAL FIELD

Embodiments herein relate to channel access configuration and in particular to channel configuration for Long Term Evolution (LTE). MulteFire. LTE-Unlicensed (LTE-U), and Licensed Assisted Access (LAA).

BACKGROUND

In a typical wireless communication network, wireless devices, also known as wireless communication devices, mobile stations, stations (STA) and/or user equipments (UEs), communicate via a Radio Access Network (RAN) to one or more core networks. The RAN covers a geographical area which is divided into service areas or cell areas, with each service area or cell area being served by an access point e.g. a radio network node such as a radio access node e.g., a Wi-Fi access point or a radio base station (RBS), which in some networks may also be denoted, for example, a "NodeB" or "eNodeB". The area or cell area is a geographical area where radio coverage is provided by the access point. The access point communicates over an air interface operating on radio frequencies with the wireless device within range of the access point.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some RANs, e.g. as in UMTS, several access points may be connected, e.g., by landlines or microwave, to a controller node, such as a radio network controller (RNC) or a base station controller (BSC), which supervises and coordinates various activities of the plural access points connected thereto. This type of connection is sometimes referred to as backhaul connection. The RNCs are typically connected to one or more core networks.

Specifications for the Evolved Packet System (EPS) have been completed within the 3rd Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of an RNC are distributed between the radio base stations, e.g. eNodeBs in LTE, and the core network. As such, the RAN of an EPS has an essentially "flat" architecture comprising radio base stations connected directly to one or more core networks. i.e. they are not connected to RNCs. To compensate for that, the E-UTRAN specification defines a direct interface between radio base stations, this interface being denoted the X2 interface.

The ongoing 3GPP Rel-13 study item "Licensed-Assisted Access" (LAA) intends to allow LTE equipment to also operate in the unlicensed 5 GHz radio spectrum. The unlicensed 5 GHz spectrum is used as a complement to the licensed spectrum. Accordingly, wireless devices connect in the licensed spectrum. e.g. in a primary cell (PCell) and use carrier aggregation (CA) to benefit from additional transmission capacity in the unlicensed spectrum e.g. in a secondary cell (SCell). To reduce the changes required for aggregating licensed and unlicensed spectrum, an LTE frame timing in the primary cell is simultaneously used in the secondary cell.

Regulatory requirements, however, may not permit transmissions in the unlicensed spectrum without prior channel sensing. Since the unlicensed spectrum must be shared with other radios of similar or dissimilar wireless technologies, a so called listen-before-talk (LBT) method needs to be applied. LBT involves sensing the medium for a pre-defined minimum amount of time and backing off if the channel is busy. Today, the unlicensed 5 GHz spectrum is mainly used by equipment implementing the IEEE 802.11 Wireless Local Area Network (WLAN) standard. This standard is known under its marketing brand "Wi-Fi."

LTE uses Orthogonal Frequency Division Multiplexing (OFDM) in the downlink and Discrete Fourier Transform (DFT)-spread OFDM, also referred to as Single-Carrier Frequency Division Multiple Access (SC-FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organised into radio frames of 10 ms, each radio frame consisting of ten equally-sized subframes of length Tsubframe=1 ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 μs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled. i.e., in each subframe the access point transmits control information about which wireless device's data is transmitted to and upon which resource blocks the data is transmitted, in the current downlink subframe. This control signalling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3.

From LTE Rel-11 onwards, above described resource assignments may also be scheduled on the enhanced Physical Downlink Control Channel (EPDCCH). For Rel-8 to Rel-10 only Physical Downlink Control Channel (PDCCH) is available.

The reference symbols shown in FIG. 3 may be the cell specific reference symbols (CRS) and may be used to support multiple functions including fine time and frequency synchronisation and channel estimation for certain transmission modes.

The 3GPP LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier may be referred to as a Component Carrier (CC). In particular for early LTE Rel-10 deployments it can be expected that there will be a smaller number of LTE Rel-10-capable wireless devices compared to many LTE legacy wireless devices. Therefore, it is necessary to assure an efficient use of a wide carrier also for legacy wireless devices, i.e. that it is possible to implement carriers where legacy wireless devices may be scheduled in all parts of the wideband LTE Rel-10 carrier. The straightforward way to obtain this would be by means of Carrier Aggregation (CA). CA implies that an LTE Rel-10 wireless device may receive multiple CCs, where the CCs have, or at least the possibility to have, the same structure as a Rel-8 carrier. CA is illustrated in FIG. 4. A CA-capable wireless device is assigned a primary cell (PCell) which is always activated, and one or more secondary cells (SCells) which may be activated or deactivated dynamically. A wireless device may in this disclosure also be referred to as terminal and may be any of a mobile phone, personal digital assistant, tablet, laptop, or any other device that may communicate by means of radio with a node in a Radio Access Network, RAN. Some non-limiting examples of such a wireless devices are a vehicle, vending machine, parking meter or any other type of device having communication capabilities to communicate by means of radio with an access point in a RAN.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a wireless device: A wireless device may for example support more downlink CCs than uplink CCs, even though the cell is configured with the same number of uplink and downlink CCs.

In addition, a key feature of carrier aggregation is the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a wireless device expects to receive scheduling messages on the (E)PDCCH on just one CC—either the same CC, or a different CC via cross-carrier scheduling. The mapping from (E)PDCCH to Physical Downlink Shared Channel (PDSCH) is also configured semi-statically.

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. i.e. traffic NOT detected on the channel. In case the channel is declared as Busy. i.e. traffic detected on the channel, the transmission is essentially deferred until the channel is deemed to be Idle. When the range of several Access Points (AP) using the same frequency overlap, this means that all transmissions related to one AP might be deferred in case a transmission on the same frequency to or from another AP which is within range may be detected. Effectively, this means that if several APs are within range, they will have to share the channel in time, and the throughput for the individual APs may be severely degraded. A general illustration of the listen before talk (LBT) mechanism is shown in FIG. 5.

A general illustration of the listen before talk (LBT) mechanism is shown in FIG. 5. Action 1. A transmitter performs a CCA using energy detection. The transmitter detects no traffic on the channel. Action 2. The transmitter occupies the channel and starts a data transmission. Furthermore, the transmitter may send Control (Ctrl) signals without (w/o) CCA check denoted as action 5. Action 3. The transmitter remains idle and starts a CCA in the end of the idle period. Traffic is detected on the channel and the channel is busy. Action 4. Thus, no transmission is allowed on the channel as the channel is busy and in the end of the prohibited time the transmitter starts a CCA using energy detection. The transmitter detects no traffic on the channel and the transmitter occupies the channel and starts a data transmission.

Up to now, the spectrum used by LTE is dedicated to LTE. This has the advantage that LTE system does not need to care about the coexistence issue and the spectrum efficiency may be maximised. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum. Unlicensed spectrum may, by definition, be simultaneously used by multiple different technologies. Therefore. LTE should consider the coexistence issue with other systems such as IEEE 802.11, also called Wi-Fi. Operating LTE in the same manner in unlicensed spectrum as in licensed spectrum may seriously degrade the performance of Wi-Fi as Wi-Fi will not transmit once the channel is detected as occupied.

SUMMARY

An object of embodiments herein is to provide a mechanism that improves the performance of a wireless communication network.

According to an aspect the object is achieved by providing a method performed by a scheduling node for scheduling an uplink transmission from a wireless device to the scheduling node. The wireless device is connected to a Pcell of the scheduling node in a licensed or unlicensed frequency band, and wherein the wireless device is also connected to at least one SCell in an unlicensed frequency band. The scheduling node determines at least one LBT parameter associated with an LBT procedure; and informs the wireless device about the determined at least one LBT parameter in a scheduling grant of the uplink transmission.

According to another aspect the object is achieved by providing a method performed by a wireless device for performing an uplink transmission to a scheduling node. The wireless device is connected to a Pcell of the scheduling node in a licensed or unlicensed frequency band, and the wireless device is also connected to at least one SCell in an unlicensed frequency band. The wireless device receives information, in a scheduling grant of the uplink transmission, of at least one LBT parameter associated with an LBT procedure. The wireless device performs the LBT procedure using the at least one LBT parameter when transmitting data according to the received scheduling grant.

According to yet another aspect the object is achieved by providing a scheduling node for scheduling an uplink transmission from a wireless device to the scheduling node. The scheduling node is configured to serve a Pcell in a licensed or unlicensed frequency band and which wireless device is configured to connect to the Pcell, and wherein the wireless device is also configured to connect to at least one SCell in an unlicensed frequency band. The scheduling node is configured to determine at least one LBT parameter associated with an LBT procedure; and to inform the wireless device about the determined at least one LBT parameter in a scheduling grant of the uplink transmission.

According to yet still another aspect the object is achieved by providing a wireless device for performing an uplink transmission to a scheduling node, which wireless device is configured to connect to a Peell of the scheduling node in a licensed or unlicensed frequency band. The wireless device is also configured to connect to at least one SCell in an unlicensed frequency band. The wireless device is further being configured to receive information, in a scheduling grant of the uplink transmission, of at least one LBT parameter associated with an LBT procedure. The wireless device is further configured to perform the LBT procedure using the at least one LBT parameter when transmitting data according to the received scheduling grant.

It is herein also provided a computer program comprising instructions, which, when executed on at least one processor, cause the at least one processor to carry out the methods herein, as performed by the scheduling node or the wireless device. Furthermore, it is herein provided a computer-readable storage medium, having stored thereon a computer program comprising instructions which, when executed on at least one processor, cause the at least one processor to carry out the methods herein, as performed by the scheduling node or the wireless device.

An advantage of embodiments herein is that the use of a suboptimal LBT parameter at the wireless device may be avoided as the determined, e.g. an updated. LBT parameter is informed to the wireless device in the scheduling grant and the channel access probability of the wireless device may thus be improved. This will lead to an improved performance of the wireless communication network.

BRIEF DESCRIPTION OF THE DRAWINGS

Embodiments will now be described in more detail in relation to the accompanying drawings, in which:

FIG. 8 is an illustration of joint grant transmission, one downlink subframe comprising uplink grants for several consecutive subframes.

FIG. 9 is an illustration of joint grant transmission, one subframe comprising uplink grants for several non-consecutive uplink subframes.

FIG. 10 is an illustration of an example of a downlink data buffer-dependent adaptation of the delay between joint uplink grant transmission and uplink burst transmission.

FIG. 11a comprises table 1, which is an example of LBT parameters in form of predefined tables in set s=1, with K=5 and defer period=23 µs for all k.

FIG. 11b comprises table 2, which are examples of LBT parameters in form of predefined tables in set s=2, with K=8 and defer period=43 µs for all k.

DETAILED DESCRIPTION

Figure 1:
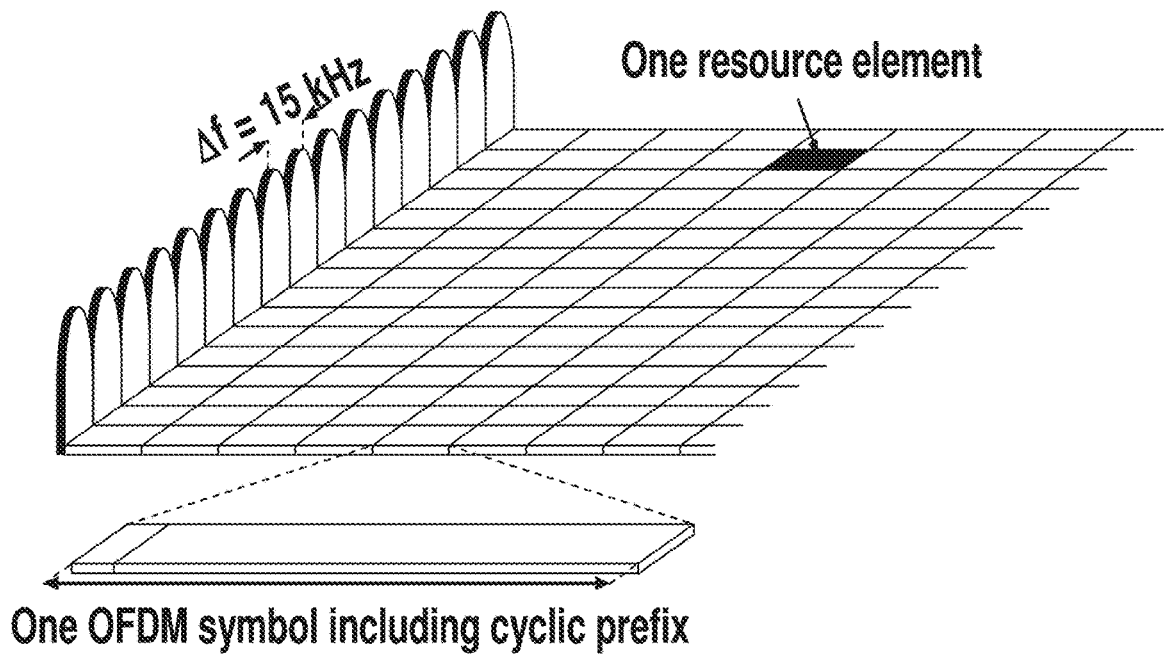
FIG. 1 is an illustration of one OFDM symbol including cyclic prefix.
Figure 2:
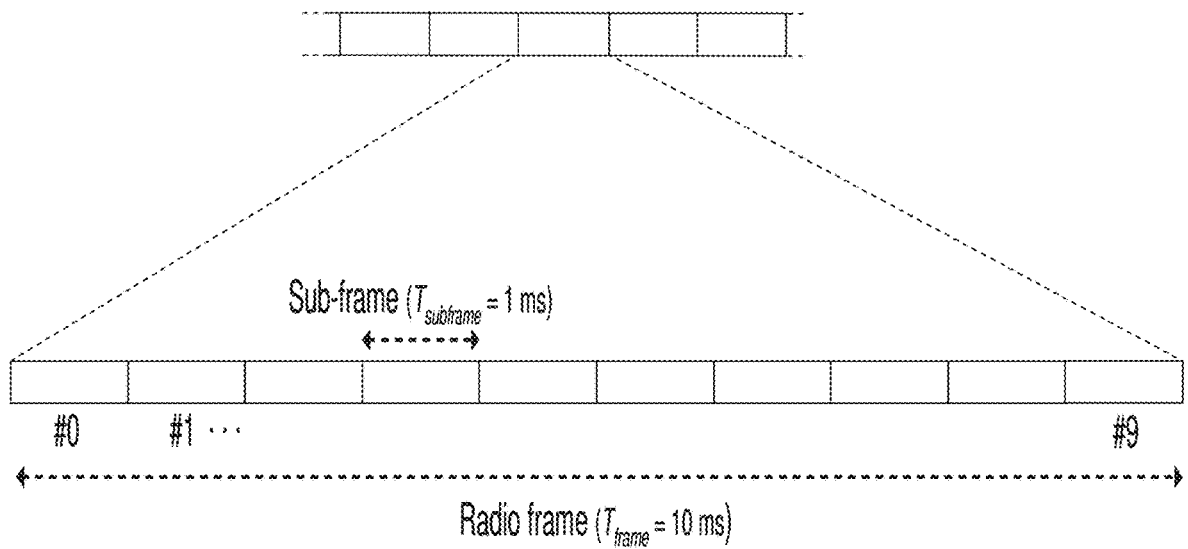
FIG. 2 is an illustration of the LTE time-domain structure.
Figure 3:
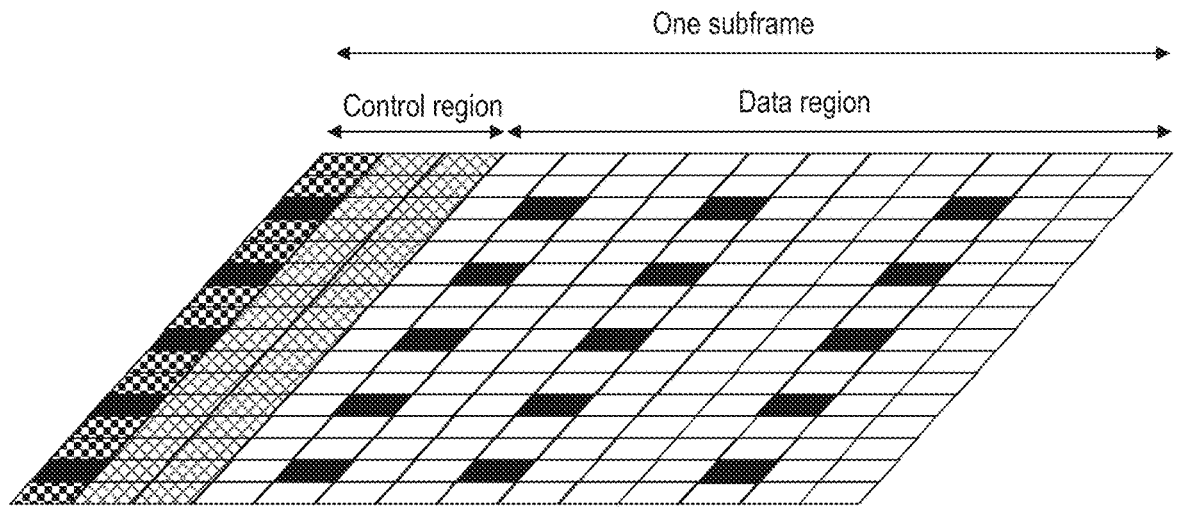
FIG. 3 is an illustration of a normal downlink subframe.
Figure 4:
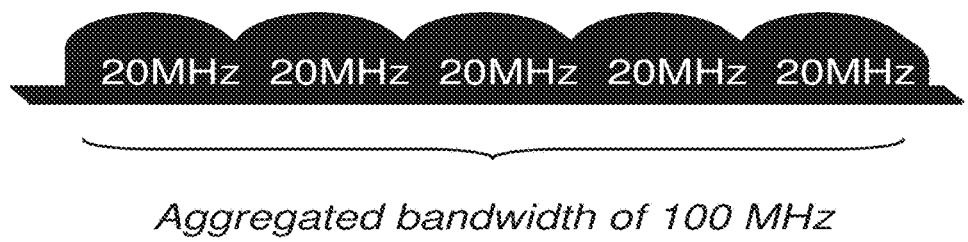
FIG. 4 is an illustration of carrier aggregation with an aggregated bandwidth of 100 MHz.
Figure 5:
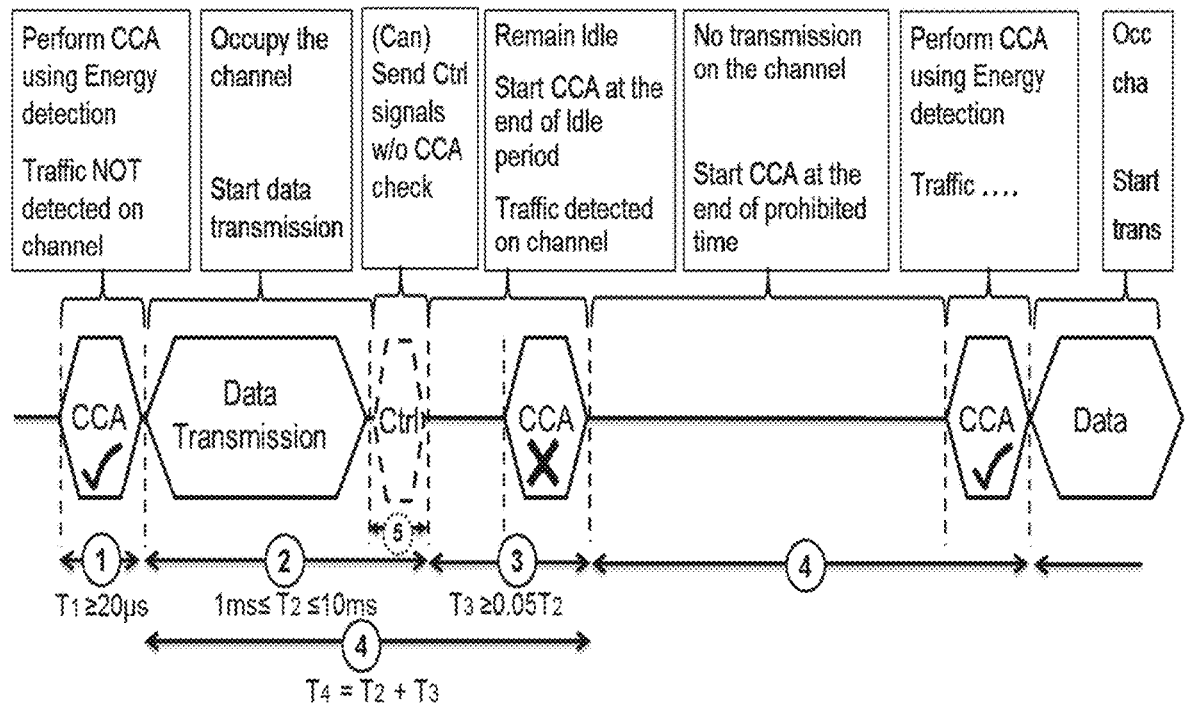
FIG. 5 is an illustration of a Listen Before Talk, LBT, procedure.
Figure 6:
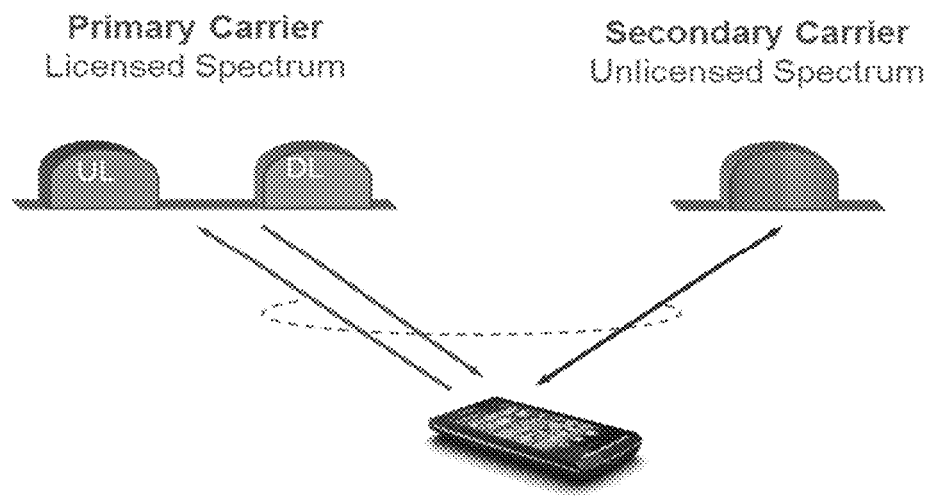
FIG. 6 is an illustration of LAA to unlicensed spectrum using LTE carrier aggregation.

One way to utilise the unlicensed spectrum reliably is to transmit essential control signals and channels on a licensed carrier. That is, as shown in FIG. 6, a wireless device is connected to a PCell in e.g. the licensed band and one or more SCells in the unlicensed band. In this application a secondary cell in unlicensed spectrum is denoted as a licensed-assisted access secondary cell (LAA SCell).

In the unlicensed band, a wireless device or an access point performs LBT in order to access the channel for data transmission or sending scheduling information. In LAA with uplink, UL, transmission on the unlicensed band, an access point controls the UL scheduling of one or multiple wireless devices. On the UL, the wireless devices may perform a short LBT with a limited contention window (CW) before transmission or may transmit after the completion of a successful defer period, or may follow some similar LBT procedure. Each wireless device therefore should maintain a set of UL LBT parameters including the current CW, length of defer period, random backoff counter, length of initial CCA (if any), duration of quick CCAs on channels other than the principal random backoff channel, rate of CW size adaptation (if any), triggers used to adapt CW size, etc.

Uplink Hybrid Automatic Repeat Request (HARQ) in LAA is now asynchronous with the Physical Hybrid-ARQ Indicator Channel, (PHICH) being absent. So the wireless device does not know whether its packet was received and whether its uplink LBT parameters should be modified until it is explicitly rescheduled by the scheduling node. In the interim period before new scheduling/rescheduling grants from the scheduling node, the wireless device may therefore be using suboptimal UL LBT parameters. Other examples of a scheduling node are an Access Point, a Base Station, a Radio Base Station, a Base Station Controller, and a Radio Node Controller.

A mismatch in UL LBT parameters also makes UL multiplexing more difficult, since wireless devices scheduled in the same subframe are less likely to transmit simultaneously. The scheduling node generally has greater access to network-wide information such as traffic load and may make better choices for LBT parameters of the scheduled wireless devices.

Thus, the choice of parameters used in the LBT procedure prior to accessing the channel has a major impact on inter-RAT coexistence and throughput.

It is therefore an object of embodiments herein to ensure that one or more LBT parameters are regularly or continuously determined e.g. updated and/or adjusted and that a scheduled wireless device is provided with the determined, updated or adjusted one or more LBT parameters.

Figure 7A:
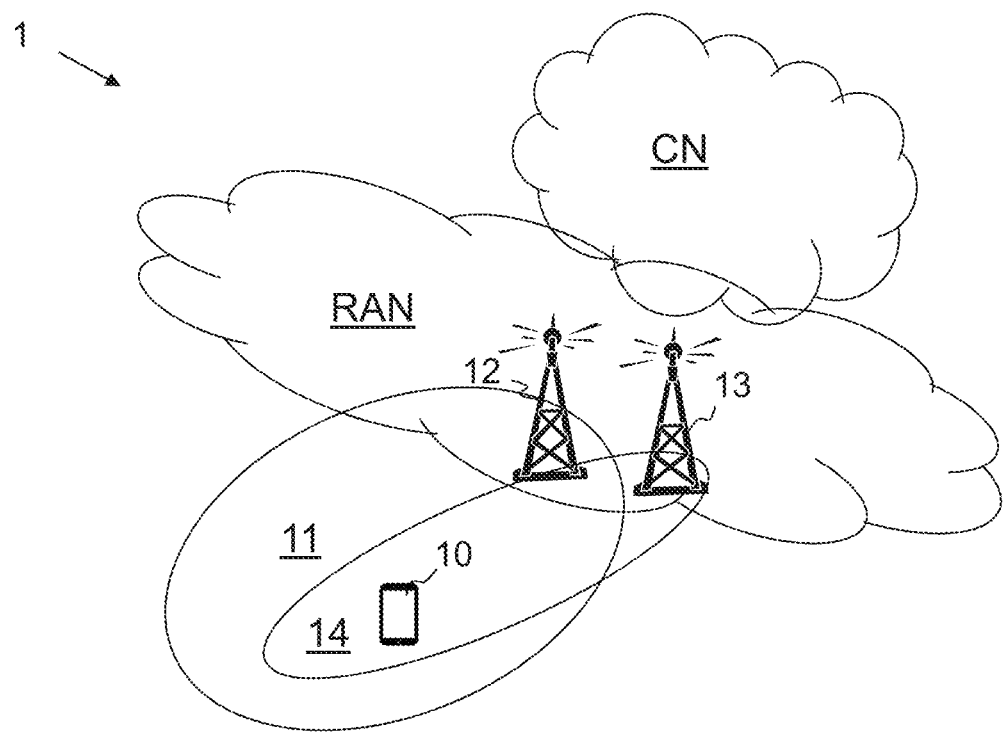
FIG. 7a shows a schematic overview depicting a wireless communication network according to embodiments herein.

Embodiments herein relate to wireless communication networks in general. FIG. 7a is a schematic overview depicting a wireless communication network 1. The wireless communication network 1 comprises one or more RANs and one or more CNs. The wireless communication network 1 may use a number of different technologies, such as Wi-Fi, Long Term Evolution (LTE), LTE-Advanced, 5G, MulteFire, LTE-Unlicensed (LTE-U), Licensed Assisted Access (LAA), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context such as MulteFire, LTE-Unlicensed (LTE-U), and Licensed Assisted Access (LAA), however, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communication network 1 comprises a first access point, denoted as scheduling node 12 providing radio coverage over a geographical area, a first service area 11, of a first radio access technology (RAT), such as LTE, Wi-Fi or similar. The scheduling node 12 may be a transmission and reception point e.g. a radio network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the area served by the scheduling node 12 depending e.g. on the first radio access technology and terminology used. The scheduling node 12 may be referred to as a serving access point and communicates with the wireless device 10 with DL transmissions to the wireless device 10 and UL transmissions from the wireless device 10.

Furthermore, the wireless communication network 1 comprises a second access point 13 providing radio coverage over a geographical area, a second area 14, of a second RAT, such as LTE, Wi-Fi, WiMAX or similar. The second access point 13 may be a transmission and reception point e.g. a radio network node such as a WLAN access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the area served by the second access point 13 depending e.g. on the second radio access technology and terminology used.

The first and second RAT may be the same or different RATs and the first service area 11 may be referred to as a first beam group, first beam or a first cell such as a primary cell (PCell). The second service area 14 may be referred to as a second beam group, second beam or a second cell such as a secondary cell (SCell). It should be noted that the second service area 14 may be provided by the same access point as the first service area i.e. by the scheduling node 12.

The scheduling node 12 may coordinate communication with the second access point 13 in the wireless communication network 1. This is done by communicating with one another over a backhaul connection, e.g. an X2 connection, an S1 connection or similar, between the scheduling node 12 and the second access point 13. The scheduling node 12 may schedule transmissions to and from the wireless device 10 for both the scheduling node 12 as well as the second access node 13.

The wireless device 10 is configured to perform an LBT procedure to transmit data in the second service area 14. According to embodiments herein, the LBT parameters of the scheduled device(s), i.e. the wireless device 10, may be dynamically determined or adjusted by the scheduling node 12 via e.g. L1 signalling. The LBT parameters that may be adjusted include: the current CW, length of defer period, random backoff counters, length of initial CCA (if any), duration of quick CCAs on channels other than the principal random backoff channel, rate of CW size adaptation (if any), and triggers used to adapt CW size. An example is to signal these parameters in a downlink control information (DCI) of scheduling grants.

Embodiments herein thus describe different examples of how the LBT parameters of one or more scheduled devices, such as the wireless device 10, may be dynamically determined or adjusted by the scheduling node 12 when operating in unlicensed bands in second service area 14. The LBT parameters that may be adjusted include as stated above, but is not limited to, the current CW, length of defer period, random backoff counters, length of initial CCA (if any), duration of quick CCAs on channels other than the principal random backoff channel, rate of CW size adaptation (if any), and triggers used to adapt CW size.

Figure 7B:
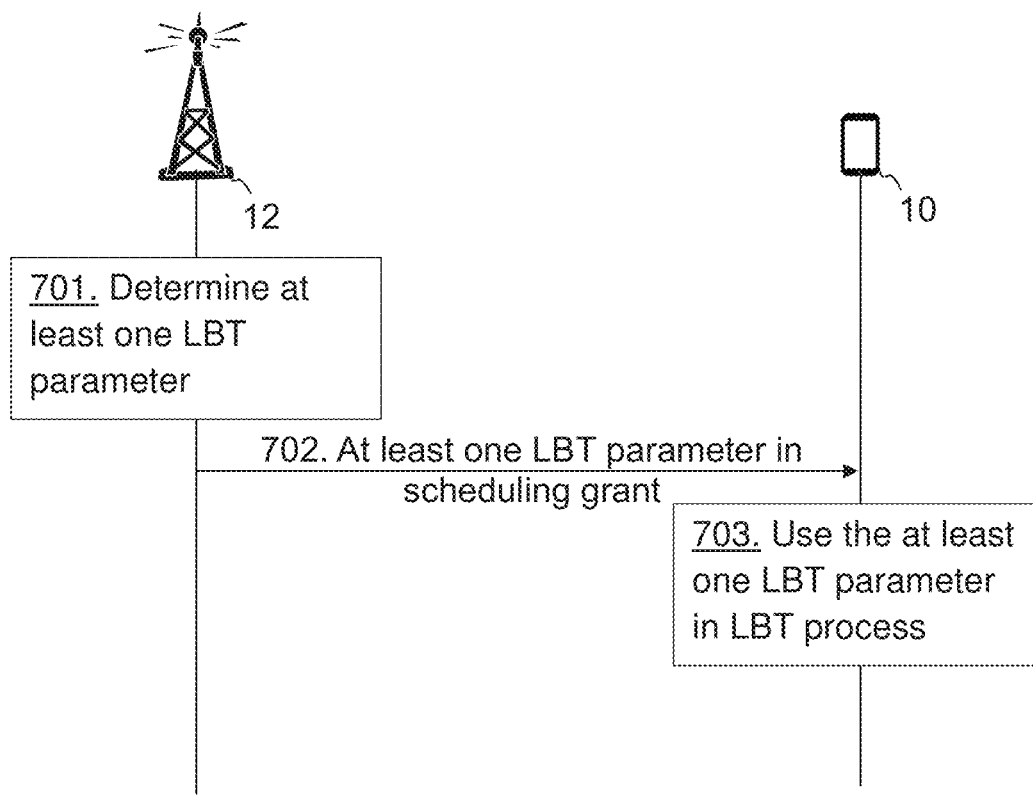
FIG. 7b shows a combined flowchart and signalling scheme according to the embodiments.

FIG. 7b is a combined flowchart and signalling scheme according to embodiments herein.

Action 701. The scheduling node 12 determines, e.g. adjusts dynamically, at least one LBT parameter associated with an LBT procedure.

Action 702. The scheduling node 12 informs the wireless device 10 about the determined at least one LBT parameter in a scheduling grant of the uplink transmission e.g. for data transmission in licensed spectrum.

Action 703. The wireless device 10 then uses the at least one LBT parameter in the LBT procedure when transmitting data according to the received scheduling grant.

Figure 7C:
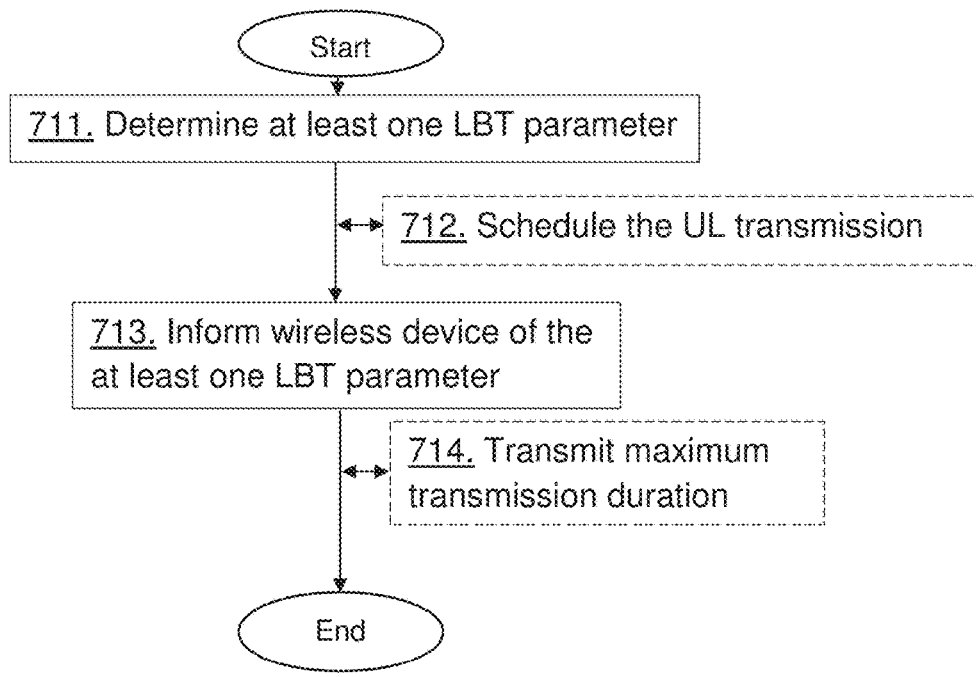
FIG. 7c shows a flowchart depicting a method performed by a scheduling node according to embodiments herein.

The method actions performed by the scheduling node 12, exemplified herein as the first access point, for scheduling an uplink transmission from the wireless device 10 to the scheduling node 12 according to some embodiments will now be described with reference to a flowchart depicted in FIG. 7c. The wireless device 10 is connected to the Pcell of the scheduling node 12 in a licensed or unlicensed frequency band. The wireless device 10 is also connected to at least one SCell in an unlicensed frequency band. The actions do not have to be taken in the order stated below, but may be taken in any suitable order. Actions performed in some embodiments are marked with dashed boxes.

Action 711. The scheduling node 12 determines at least one LBT parameter associated with an LBT procedure. The at least one LBT parameter may be specific for the wireless device 10 or is common for a plurality of wireless devices that are associated with the scheduling node 12. The at least one LBT parameter may be one of: CW size, length of defer period, random backoff counter, length of initial CCA, duration of quick CCAs on channels other than the principal random backoff channel, rate of CW size adaptation, triggers to adapt CW size.

Action 712. The scheduling node 12 may schedule the uplink transmission to a single subframe or a burst of subframes; and corresponding scheduling information is added to the scheduling grant. The scheduling node 12 may determine a delay between a joint grant transmission and a first uplink subframe and to schedule multiple uplink subframes using the joint grant transmission. The first uplink subframe is scheduled based on the determined delay, wherein the delay may be determined based on a downlink data buffer and the number of uplink subframes scheduled by means of a joint grant is based on the uplink buffer of the wireless device. The delay may take an LBT process into account for the wireless device 10 to perform the LBT before transmitting the UL data.

Action 713. The scheduling node 12 informs the wireless device 10 about the determined at least one LBT parameter in the scheduling grant of the uplink transmission. The scheduling node 12 may inform the wireless device 10 of the at least one LBT parameter by means of a common search space on the PDCCH, or another downlink control channel. The scheduling node 12 may inform the wireless device 10 of the at least one LBT parameter by means of broadcasting. The at least one LBT parameter may be an actual/absolute value of the LBT parameter or an offset to be added/subtracted to a current value of the LBT parameter. The scheduling node 12 may determine in action 711 at least two different sets of LBT parameters for the wireless device 10 to be used by the wireless device 10 in successive LBT attempts. Which set to be used by the wireless device 10 may be determined according to a predefined rule or predefined table and may be signalled to the wireless device 10. The wireless device 10 may be configured with different sets of LBT parameters. The sets may contain CW sizes in increasing order for consecutive LBT attempts and their corresponding length of defer period. The wireless device 10 may be indicated which set to use by signalling, via higher layer signalling or L1 signalling. Furthermore, an index of the LBT attempt k, may be signalled to the wireless device 10 as well.

Action 714. The scheduling node 12 may signal, to the wireless device 10, a maximum transmission duration. E.g. in unlicensed spectrum, the wireless device can transmit continuously only up to the maximum transmission duration, according to regulation e.g., 6 ms or 8 ms, not needing to perform LBT during the transmission duration.

Figure 7D:
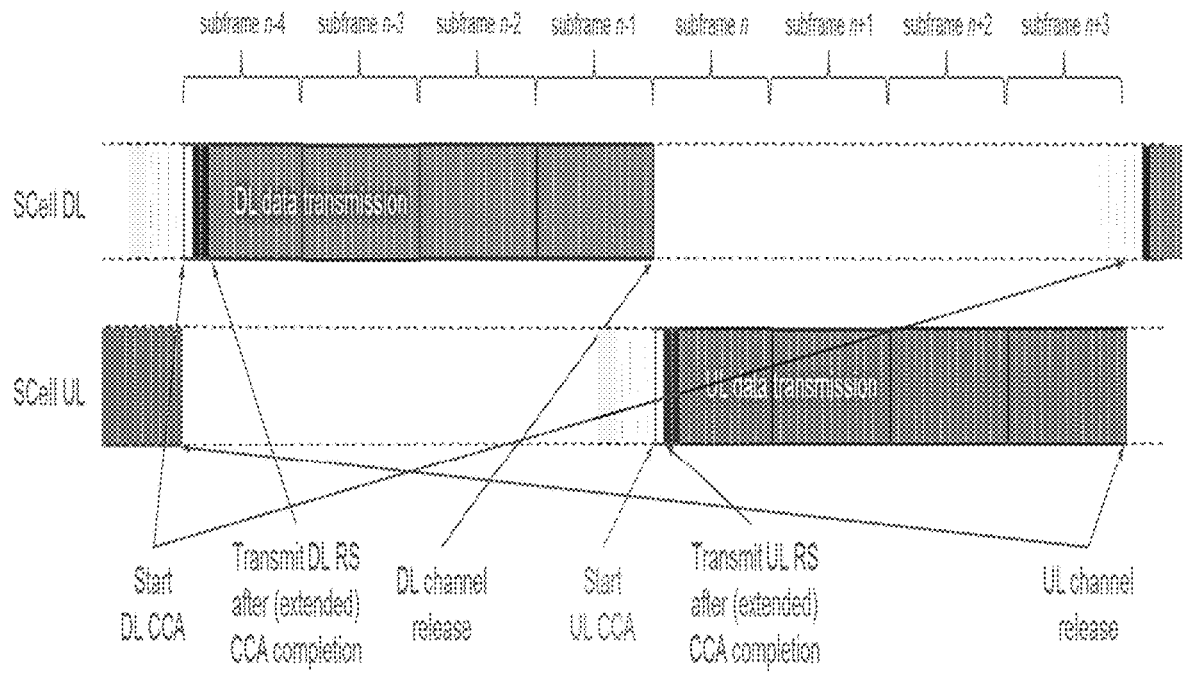
FIG. 7d is an illustration of uplink LAA transmissions based on an uplink LBT protocol.

An example of an LAA uplink transmission spanning several subframes subsequent to a successful uplink LBT procedure is shown in FIG. 7d.

The uplink, UL. LBT is performed prior to an UL transmission based on a previously-received UL resource grant sent by the scheduling SCell or PCell. Multiple wireless devices may perform LBT procedures in parallel if they have been scheduled in the same UL subframe.

The major LBT parameters of the LBT procedure performed by the wireless devices may include:
the current CW (upper and/or lower limit),
length of defer period,
random backoff counters, where separate random backoff counters may be used for separate unlicensed channels,
length of initial CCA (if any),
duration of quick CCAs on channels other than the principal random backoff channel, if the full LBT procedure with random backoff is performed only on one such channel,
rate of CW size adaptation (if any), and/or
triggers used to adapt CW size.

In the following, different example embodiments in which one or more of the above LBT parameters may be signalled by the scheduling node 12 are provided. The adaptation of parameters may be performed by signalling an absolute value of the new parameter(s), or by signalling a differential quantity by which to step up or step down the current parameter value. The time duration for which the signalled parameters should be adopted by the scheduled devices may also be included in the LBT parameter signalling, or may be defined semi-statically using higher-layer signalling. A subset of the above LBT parameters may also be signalled using higher-layer signalling. A non-limiting example of said higher layer signalling is the radio resource control (RRC) layer signalling in LTE.

In a first exemplifying embodiment, the one or more LBT parameters are signalled using new fields in e.g. the DCI associated with resource allocation grants sent on the (E)PDCCH. These grants may typically be located in the wireless device-specific search space. The scheduling grants containing the at least one LBT parameter may correspond to a single subframe or a burst of subframes such as in a joint grant on a particular channel, or a single subframe or burst of subframes across multiple channels, such as in a multi-carrier grant. The multiple subframes scheduled by a joint grant are not necessarily consecutive. FIG. 8 illustrates an example of a joint grant transmission where one DL subframe contains UL grants for several consecutive UL subframes. FIG. 9 illustrates another example of a joint grant transmission with non-consecutive UL subframes. In the following L is the number of UL subframes scheduled by the joint grant. Hardware limitations may impose a minimum delay between the joint grant reception and the start of the first scheduled UL subframe. 6 is the minimum number of subframes required between the start of the DL subframe with the joint grant and the start of the first UL subframe. In the example of FIG. 8 and FIG. 9, L=4 and S=4.

As a non-limiting example, the scheduling node 12 may signal a common random backoff counter to all wireless devices scheduled for UL transmission starting in the same subframe or burst of subframes.

In another non-limiting example, the scheduling node 12 may signal wireless devices, i.e. scheduled devices, to adopt only a defer period without additional random backoff for a particular UL subframe or burst of subframes.

In another non-limiting example, the scheduling node 12 may signal a common random backoff counter and defer period to all wireless devices scheduled for UL transmission starting in the same subframe or burst of subframes.

In a second exemplifying embodiment, the LBT parameters that should be adopted by multiple wireless devices, e.g. scheduled devices, associated with the scheduling node 12 is signalled in the common search space which is typically used for paging, transmit power control commands, and system information signalling. A new RNTI may be defined for this purpose. The common search space is for example, a common PDCCH control region in a subframe that is known to a plurality of devices.

In a third exemplifying embodiment, the LBT parameters may be embedded in broadcast signals such as the Discovery reference Signal (DRS) or System Information Blocks (SIB). Here, the adaptation of LBT parameters may be on a slower time scale compared to the use of scheduling grants.

In a fourth exemplifying embodiment, the wireless device 10 may be granted resource in the UL spanning longer than the allowed maximum transmission duration of a wireless device or a set of wireless devices. The wireless device 10 may after the maximum transmission duration re-do the channel access scheme to check whether it may continue transmitting within another transmission duration. The maximum transmission duration may be signalled to the wireless device 10 within the DCI format directly, e.g. as a specific subframe where the channel access scheme shall be performed as a counter based on the number of subframe the wireless device 10 is allowed to transmit. Another option is that the wireless device 10 is signalled by higher layer what the maximum transmission duration is. Yet another option is that it is always fixed to a specific value.

In a fifth exemplifying embodiment, the scheduling node 12 schedules multiple UL subframes using a joint grant transmission and the delay between the joint grant transmission and the first UL subframe is determined according to the downlink (DL) data buffer. In this embodiment the first UL subframe signalled in the joint grant transmitted by the scheduling node 12 depends on the downlink (DL) data buffer.

FIG. 10 gives an example of how this may be applied if the accumulated duration of all L UL subframes scheduled by means of a joint grant does not exceed the maximum allowed transmission duration and if $\delta<=L$. In FIG. 10 is $\delta=L=4$. When the scheduling node 12 has DL data in the buffer to be transmitted to any served wireless device, the UL grant transmitted in subframe n corresponds to a first UL subframe starting in subframe $n+\delta$. This enables to fill in the subframes n to $n+\delta-1$ with DL data. When the scheduling node 12 does not have DL data in buffer, the joint UL grant transmitted in subframe n corresponds to an UL burst starting in subframe $n+L+2$. This enables to interlace perfectly the DL subframes containing the UL grant and the UL subframes without leaving any unscheduled subframe after an initialisation phase, which would lead to reduced UL data rate.

In a sixth exemplifying embodiment, the number of UL subframes scheduled by means of a joint grant is adapted to the UL buffer situation of the wireless device 10. e.g. the scheduled device, to be scheduled. In LTE, estimates of the buffer situation are regularly obtained by the scheduling node 12 e.g. by means of buffer status report (BSR) sent by wireless devices. If the wireless device 10 for which the joint grant is intended has much UL data in the buffer, a large number of UL subframes scheduled in a joint grant is beneficial.

In addition to the buffer situation, the UL spectral efficiency of the to-be-scheduled wireless device 10, obtained via measurements of past UL transmission or via a prediction or estimation algorithm in the scheduling node 12, may be used to determine the optimal number of UL subframes to schedule by means of a joint grant. If the scheduled wireless device 10 is able to empty its buffer quickly, only a few UL subframes must or may be scheduled in a joint grant. Otherwise, long-term scheduling by means of a joint grant may restrict unnecessarily the number of scheduling opportunities for other wireless devices.

The number of UL subframes scheduled by means of a joint grant may also be adapted to the traffic load, and/or to the length of the queue in the BS scheduler, and/or to the fairness metric of the considered wireless device 10 compared to the fairness metric of other wireless devices, and/or to the traffic type of other active wireless devices. Example: if the BS serves other wireless devices with real-time (UL or DL) traffic, such as Voice over IP (VoIP), it might be preferable not to schedule in advance a large number of subframes to the same wireless device 10, this may remove the possibility to schedule another wireless device with highest priority in-between. LBT gaps, indicated by the at least one LBT parameter, may need to be indicated for the multiple UL subframes scheduled via the joint grant, which is indicating the UL scheduling.

In a seventh exemplifying embodiment, the wireless devices may be configured with different sets of LBT parameters. The sets may contain the CW sizes in increasing order for consecutive LBT attempts and their corresponding length of defer period. Based on pre-defined rules, or pre-defined tables the scheduled device knows how to change the LBT parameters in consecutive LBT attempts for a particular transmission burst. Examples are given for two sets in table 1 in FIG. 11a and table 2 in FIG. 11b where s is the table index, K is the maximum size of the set, k is the LBT attempt modulo K, and CWs(k) is the size of the CW for the set s and LBT attempt k modulo K. Table 1 illustrates an example of LBT parameters in form of pre-defined tables in set s=1, with K=5 and defer period=23 μs for all k; and table 2 illustrates examples of LBT parameters in form of pre-defined tables in set s=2, with K=8, and defer period=43 μs for all k In a non-limiting example the scheduled device, i.e. the wireless device 10, is indicated which set to use by signalling s via higher layer signalling or L1 signalling. The wireless device 10 may also be preconfigured to use a default set, and only change the set if it is signalled to do so, by RRC or L1 signalling.

Moreover, the wireless device 10 determines the CW size by using k, being LBT attempt modulo K, according to the tables or pre-defined rules. Via higher layer or L1 signalling, for example one bit, the scheduled device knows if it has to reset the CW to minimum, i.e. to CWs(k=0) or not. Otherwise, it determines the corresponding CW size based on the parameter k and s.

In another non-liming example, the wireless device 10 resets the CW size to minimum if some conditions are met without being signalled to do so. Some examples of the triggers for resetting the CW to minimum are as follows:

The wireless device 10 may be granted resource in the UL spanning longer than the allowed maximum transmission duration of a wireless device or a set of wireless devices. The wireless device 10 is signalled to reset the CW size for the LBT attempt after the maximum transmission duration, in order to check whether it may continue transmitting within another transmission duration.

The wireless device 10 may be granted resources in the UL spanning longer than the allowed maximum transmission duration of a wireless device or a set of wireless devices. The wireless device 10 may after the maximum transmission duration re-do the channel access scheme to check whether it may continue transmitting within another transmission duration by resetting the CW size.

The wireless device 10 may be granted resources in the UL spanning longer than one subframe. The wireless device 10 is signalled to reset the CW size for the LBT attempts taking place with an offset from the UL grant after a specific subframe or at specific subframe(s) within the granted resources.

The wireless device 10 may be granted resources in the UL spanning longer than one subframe. The wireless device 10 resets the CW size for the LBT attempts taking place with an offset from the UL grant after a specific subframe or at specific subframe(s) within the granted resources.

The offset from the UL grant may be for example a default value of be RRC configured or signalled via L1 signalling.

An example for a rule to determine the specific subframes may be every other subframe after that offset as specific subframes.

In another non-limiting example, the index of the LBT attempt k, may be signalled to the wireless device 10 as well.

Figure 12:
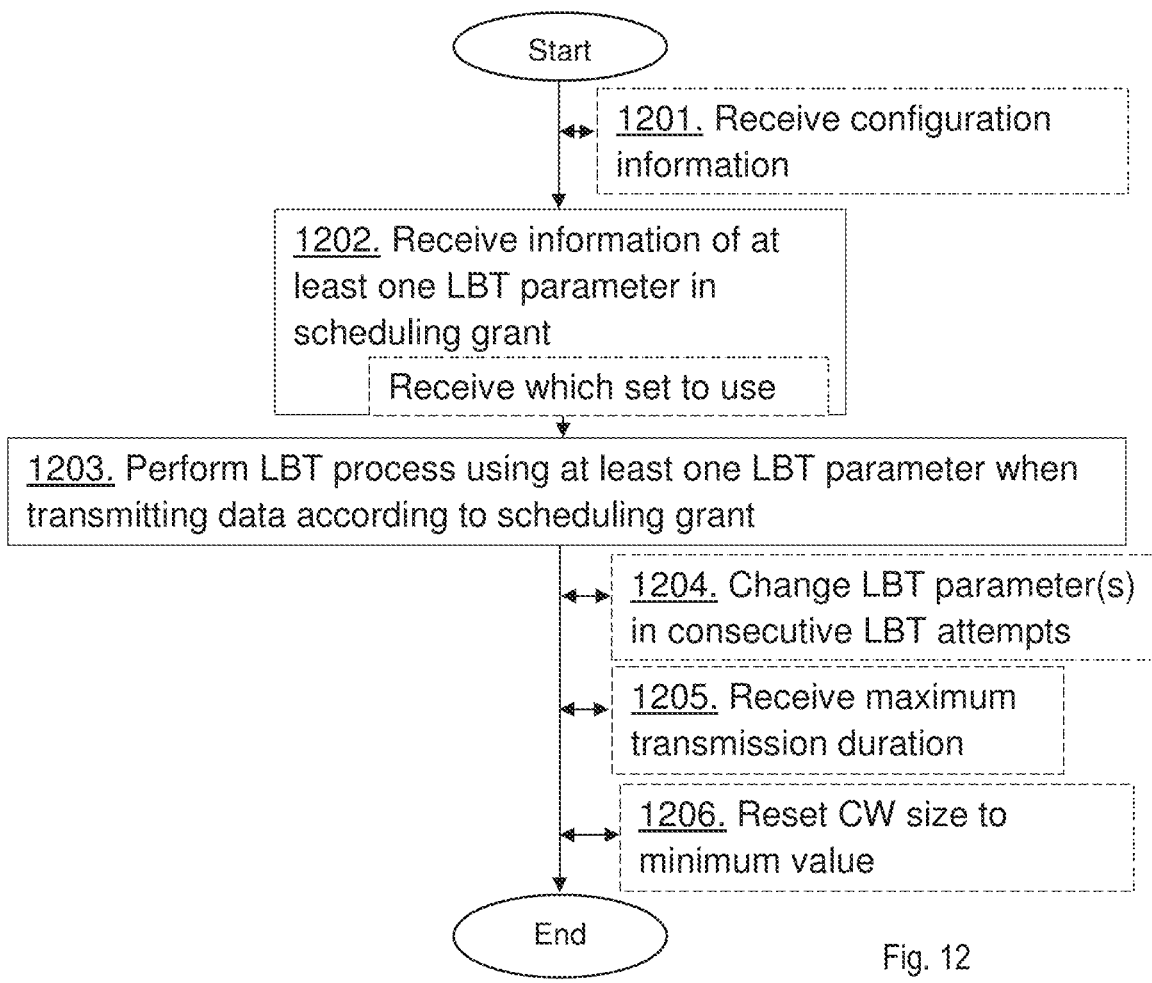
FIG. 12 shows a flowchart depicting a method performed by a wireless device according to embodiments herein.

The method actions performed by the wireless device 10 for performing the uplink transmission to the scheduling node 12, according to some embodiments will now be described with reference to a flowchart depicted in FIG. 12. The actions do not have to be taken in the order stated below, but may be taken in any suitable order. Actions performed in some embodiments are marked with dashed boxes. The wireless device 10 is connected to the Pcell of the scheduling node 12 in the licensed or unlicensed frequency band, and the wireless device 10 is also connected to at least one SCell in the unlicensed frequency band.

Action 1201. The wireless device 10 may receive, from the scheduling node 12, configuring information indicating different sets of LBT parameters.

Action 1202. The wireless device 10 receives information, in the scheduling grant of the uplink transmission, of the at least one LBT parameter associated with an LBT procedure. For example, the wireless device 10 may receive the information by means of a common search space on a PDCCH or another downlink control channel, or receive the information in a broadcast. Information. The wireless device 10 may alternatively or additionally receive information which set to use by receiving via higher layer signalling or L1 signalling.

Action 1203. The wireless device 10 performs the LBT procedure using the at least one LBT parameter when transmitting data according to the received scheduling grant.

The wireless device 10 may be configured to use a default set and only change the set when signalled to do so by RRC signalling or L1 signalling.

Action 1204. The wireless device 10 may change the at least one LBT parameter in consecutive LBT attempts for a particular transmission burst based on pre-defined rules, or pre-defined tables.

Action 1205. The wireless device 10 may receive, from the scheduling node 12, the maximum transmission duration.

Action 1206. In some embodiments the at least one LBT parameter comprises a CW size and the wireless device 10 may reset the CW size to a minimum value if some conditions are met.

Figure 13:
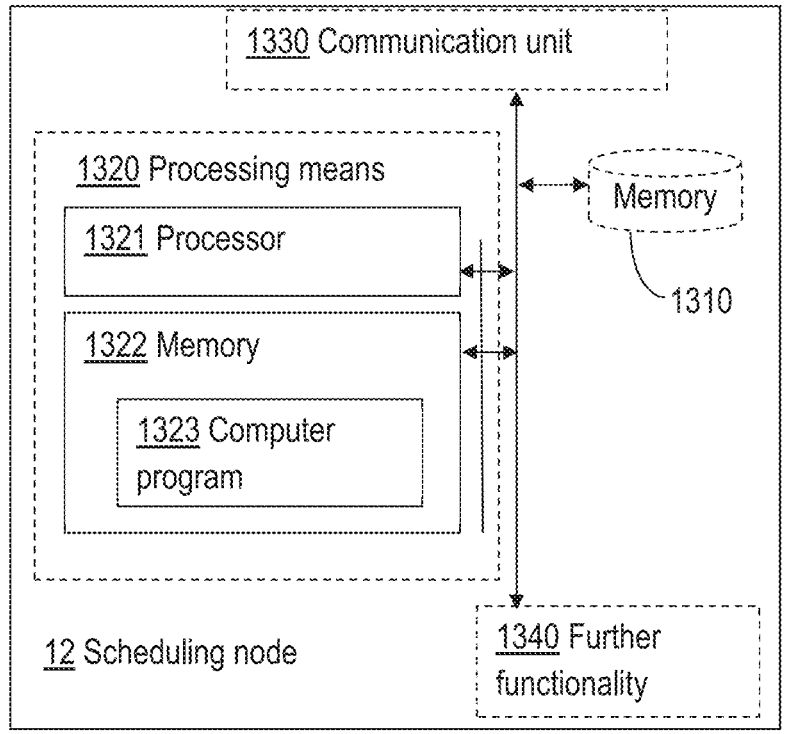
FIG. 13 is a block diagram of a scheduling node according to an exemplifying embodiment.

FIG. 13 is a block diagram of the scheduling node 12 according to an exemplifying embodiment of the scheduling node 12 for scheduling the uplink transmission from the wireless device 10 to the scheduling node 12. The scheduling node 12 is configured to serve the Pcell in a licensed or unlicensed frequency band and which wireless device 10 is configured to connect to the Pcell. The wireless device 10 is also configured to connect to at least one SCell in an unlicensed frequency band. FIG. 13 illustrates the scheduling node 12 comprising a processor 1321 and memory 1322, the memory comprising instructions. e.g. by means of a computer program 1323, which when executed by the processor 1321 causes the scheduling node 12 to perform a method according to the solution according to the different examples and embodiments described herein.

The processor 1321, and/or the scheduling node 12 may be configured to determine at least one LBT parameter associated with the LBT procedure. The at least one LBT parameter may be specific for the wireless device or is common for a plurality of wireless devices that are associated with the scheduling node 12. The at least one LBT parameter may be one of: CW size, length of defer period, random backoff counter, length of initial CCA, duration of quick CCAs on channels other than the principal random backoff channel, rate of CW size adaptation, triggers to adapt CW size. The at least one LBT parameter may be an actual/absolute value of the LBT parameter or an offset to be added/subtracted to a current value of the LBT parameter.

The processor 1321, and/or the scheduling node 12 may be configured to inform the wireless device 10 about the determined at least one LBT parameter in a scheduling grant of the uplink transmission.

The processor 1321, and/or the scheduling node 12 may be configured to schedule the uplink transmission to a single subframe or a burst of subframes; and to add corresponding scheduling information to the scheduling grant.

The processor 1321, and/or the scheduling node 12 may be configured to schedule the uplink transmission by being configured to determine a delay between the joint grant transmission and the first uplink subframe and to schedule multiple uplink subframes using the joint grant transmission. The processor 1321, and/or the scheduling node 12 may then be configured to schedule the first uplink subframe based on the determined delay, and wherein the processor 1321, and/or the scheduling node 12 may be configured to determine the delay based on a downlink data buffer and schedule the number of uplink subframes by means of a joint grant based on the uplink buffer of the wireless device.

The processor 1321, and/or the scheduling node 12 may be configured to inform the wireless device of the at least one LBT parameter by means of a common search space on the PDCCH or another downlink control channel.

The processor 1321, and/or the scheduling node 12 may be configured to inform the wireless device of the at least one LBT parameter by means of broadcasting.

The processor 1321, and/or the scheduling node 12 may be configured to signal, to the wireless device 10, a maximum transmission duration.

The processor 1321, and/or the scheduling node 12 may be configured to determine the at least one LBT parameter by being configured to determine at least two different sets of LBT parameters for the wireless device 10 to be used by the wireless device 10 in successive LBT attempts. The processor 1321, and/or the scheduling node 12 may be configured to determine which set to be used by the wireless device 10 according to a predefined rule or predefined table and the processor 1321, and/or the scheduling node 12 may be configured to signal which set to use to the wireless device 10.

FIG. 13 also illustrates the scheduling node 12 comprising a memory 1310. It shall be pointed out that FIG. 13 is merely an exemplifying illustration and memory 1310 may be optional, be a part of the memory 1322 or be a further memory of the scheduling node 12. The memory may for example comprise information relating to the scheduling node 12, to statistics of operation of the scheduling node 12, just to give a couple of illustrating examples. FIG. 13 further illustrates the scheduling node 12 comprising processing means 1320, which comprises the memory 1322 and the processor 1321. Still further, FIG. 13 illustrates the scheduling node 12 comprising a communication unit 1330. The communication unit 1330 may comprise an interface through which the scheduling node 12 communicates with other nodes, devices, UEs or entities of the communication network FIG. 13 also illustrates the scheduling node 12 comprising further functionality 1340. The further functionality 1340 may comprise hardware of software necessary for the scheduling node 12 to perform different tasks that are not disclosed herein. Merely as an illustrative example, the further functionality may comprise a scheduler for scheduling transmissions from the scheduling node 12 and/or for transmissions from scheduled devices with which the scheduling node 12 communicates with.

Figure 14:
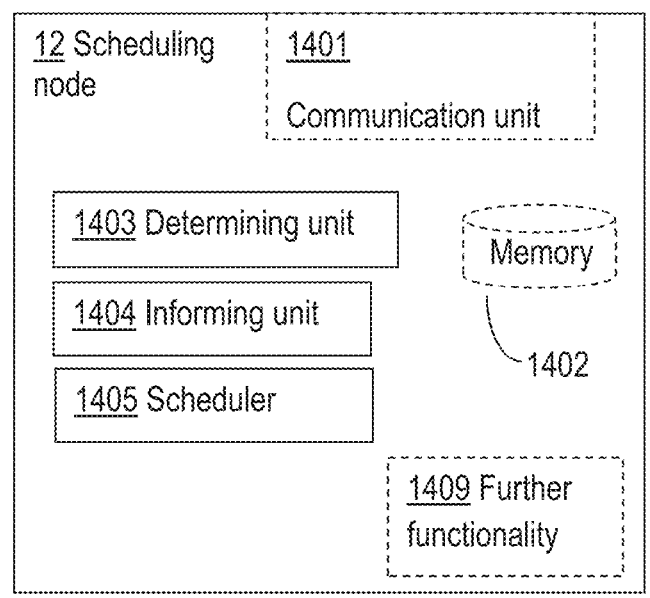
FIG. 14 is a block diagram of a scheduling node according to another exemplifying embodiment.

FIG. 14 is a block diagram of the scheduling node 12 according to another exemplifying embodiment. FIG. 14 illustrates the scheduling node 12 comprising a determining unit 1403, which could also be denoted an updating unit or adjusting unit etc., for determining and/or updating/adjusting at least one LBT parameter for the wireless device 10. FIG. 14 illustrates the scheduling node 12 further comprising an information unit 1404, which could also be denoted transmitting unit or notification unit etc., for informing concerned scheduled wireless device(s) about the determined/adjusted/updated LBT parameters to be used by the scheduled wireless device(s) hereinafter until further notice, e.g. until they are anew determined/adjusted/updated.

The determining unit 1403 may be configured to determine at least one LBT parameter associated with the LBT procedure.

The information unit 1404 may be configured to inform the wireless device 10 about the determined at least one LBT parameter in a scheduling grant of the uplink transmission.

The scheduling node 12 may comprise a scheduler 1405. The scheduler may be configured to schedule the uplink transmission to a single subframe or a burst of subframes; and to add corresponding scheduling information to the scheduling grant.

The scheduler 1405 may be configured to schedule the uplink transmission by being configured to determine a delay between the joint grant transmission and the first uplink subframe and scheduling multiple uplink subframes using the joint grant transmission. The scheduler 1405 may then be configured to schedule the first uplink subframe based on the determined delay, and wherein the scheduler 1405 may be configured to determine the delay based on a downlink data buffer and schedule the number of uplink subframes by means of the joint grant based on the uplink buffer of the wireless device.

The information unit 1404 may be configured to inform the wireless device of the at least one LBT parameter by means of a common search space on the PDCCH or another downlink control channel.

The information unit 1404 may be configured to inform the wireless device of the at least one LBT parameter by means of broadcasting.

The information unit 1404 may be configured to signal, to the wireless device 10, a maximum transmission duration.

The determining unit 1403 may be configured to determine the at least one LBT parameter by being configured to determine at least two different sets of LBT parameters for the wireless device 10 to be used by the wireless device 10 in successive LBT attempts. The determining unit 1403 may be configured to determine which set to be used by the wireless device 10 according to a predefined rule or predefined table and the information unit 1404 may be configured to signal which set to use to the wireless device 10.

In FIG. 14, the scheduling node 12 is also illustrated comprising a communication unit 1401. Through this unit, the scheduling node 12 is adapted to communicate with other nodes, devices, UEs and/or entities in the wireless communication network. The communication unit 1401 may comprise more than one receiving arrangement. For example, the communication unit 1401 may be connected to both a wire and an antenna, by means of which the scheduling node 12 is enabled to communicate with other nodes, devices. UEs and/or entities in the wireless communication network. Similarly, the communication unit 1401 may comprise more than one transmitting arrangement, which in turn is connected to both a wire and an antenna, by means of which the scheduling node 12 is enabled to communicate with other nodes, devices, UEs and/or entities in the wireless communication network. The scheduling node 12 further comprises a memory 1402 for storing data. Further, the scheduling node 12 may comprise a control or processing unit (not shown) which in turn is connected to the different units 1403-1404. It shall be pointed out that this is merely an illustrative example and the scheduling node 12 may comprise more, less or other units or modules which execute the functions of the scheduling node 12 in the same manner as the units illustrated in FIG. 14.

It should be noted that FIG. 14 merely illustrates various functional units in the scheduling node 12 in a logical sense. The functions in practice may be implemented using any suitable software and hardware means/circuits etc. Thus, the embodiments are generally not limited to the shown structures of the scheduling node 12 and the functional units. Hence, the previously described exemplary embodiments may be realised in many ways. For example, one embodiment includes a computer-readable medium having instructions stored thereon that are executable by the control or processing unit for executing method steps (according to the solution described herein by means of several examples and embodiments) in the scheduling node 12. The instructions executable by the computing system and stored on the computer-readable medium perform the method steps of the scheduling node 12 according to the herein described embodiments and examples.

Figure 15:
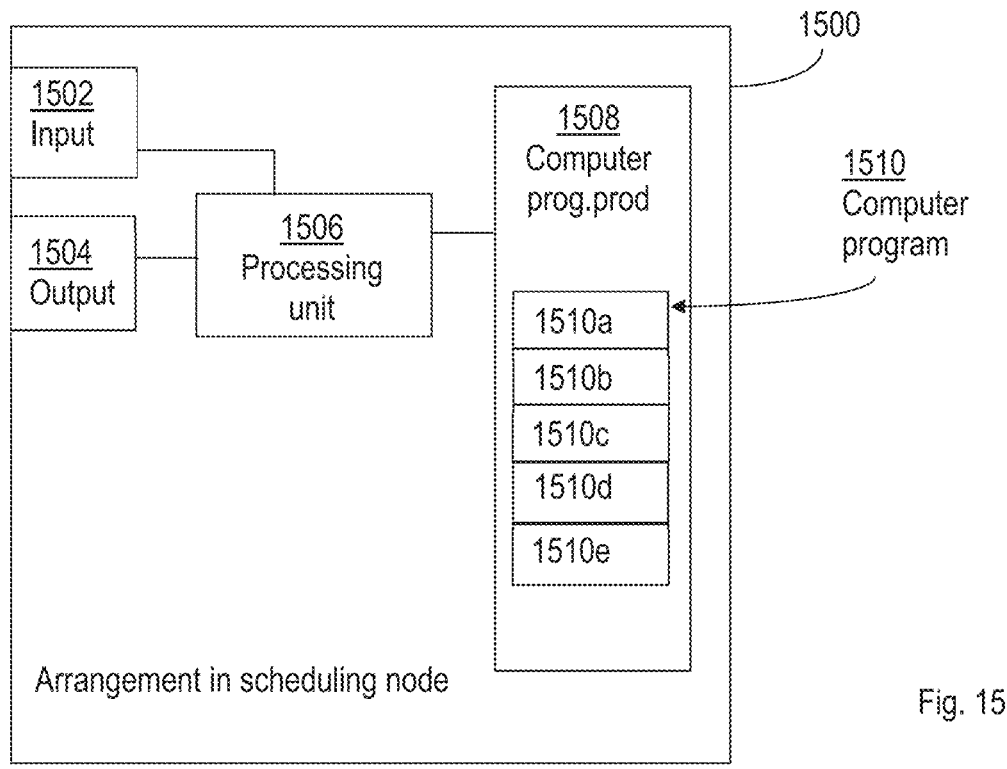
FIG. 15 is a block diagram of an arrangement in a scheduling node according to an exemplifying embodiment.

FIG. 15 schematically shows an embodiment of an arrangement 1500 in the scheduling node 12. Comprised in the arrangement 1500 in the scheduling node 12 are here a processing unit 1506, e.g. with a Digital Signal Processor. DSP. The processing unit 1506 may be a single unit or a plurality of units to perform different actions of procedures described herein. The arrangement 1500 of the scheduling node 12 may also comprise an input unit 1502 for receiving signals from other entities, and an output unit 1504 for providing signal(s) to other entities. The input unit and the output unit may be arranged as an integrated entity or as illustrated in the example of FIG. 14, as one or more interfaces 1401.

Furthermore, the arrangement in the scheduling node 12 comprises at least one computer program product 1508 in the form of a non-volatile memory, e.g. an Electrically Erasable Programmable Read-Only Memory, EEPROM, a flash memory and a hard drive. The computer program product 1508 comprises a computer program 1510, which comprises code means, which when executed in the processing unit 1506 in the arrangement 1500 in the scheduling node 12 causes the scheduling node 12 to perform the actions according to the solution as described herein by means of the various embodiments and examples.

The computer program 1510 may be configured as a computer program code structured in computer program modules 1510a-1510e. Hence, in an exemplifying embodiment, the code means in the computer program of the scheduling node 12 comprises a determining unit, or module, for determining/adjusting/updating one or more LBT parameters. The computer program further comprises an informing unit, or module, for informing/transmitting/notifying a scheduled device about the determined/adjusted/updated one or more LBT parameters.

The computer program modules could essentially perform the actions of the solution as described, to emulate the determining/adjusting/updating one or more LBT parameters. In other words, when the different computer program modules are executed in the processing unit 1506, they may correspond to the units 1403-1404 of FIG. 14.

Although the code means in the embodiments disclosed above in conjunction with FIG. 14 are implemented as computer program modules which when executed in the processing unit causes the scheduling node to perform the actions described above in the conjunction with figures mentioned above, at least one of the code means may in alternative embodiments be implemented at least partly as hardware circuits.

Figure 16:
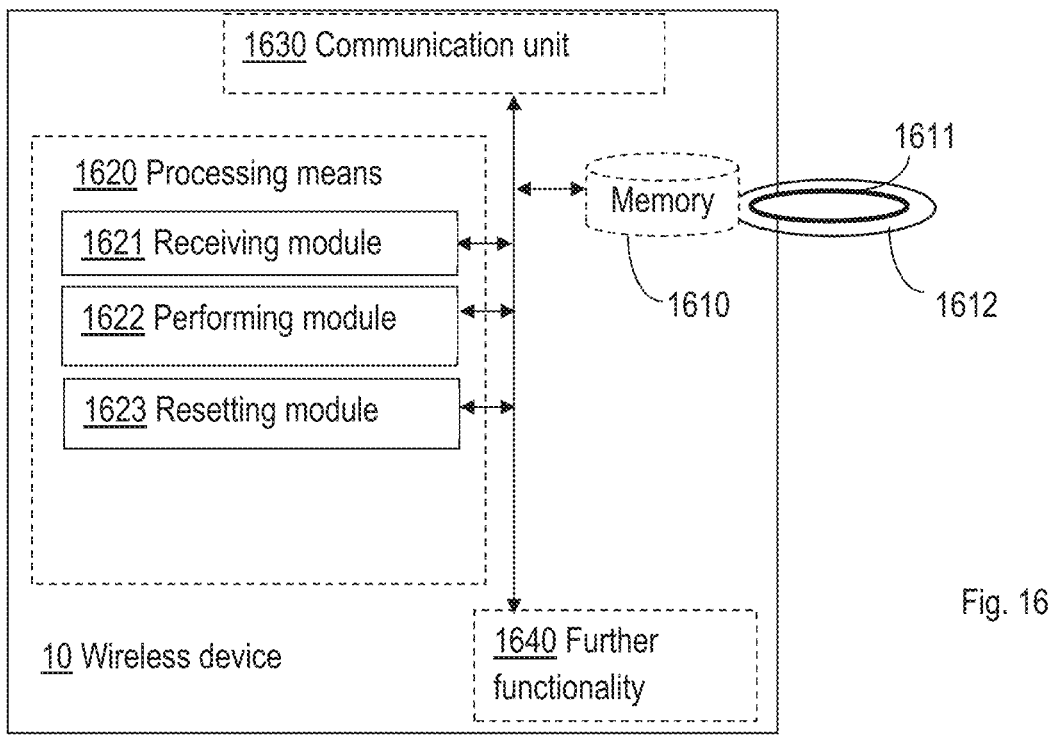
FIG. 16 shows a block diagram depicting a wireless device according to embodiments herein.

FIG. 16 is a block diagram depicting the wireless device 10 for performing the uplink transmission to the scheduling node 12 according to embodiments herein. The wireless device 10 is configured to connect to the Pcell of the scheduling node 12 in a licensed or unlicensed frequency band and the wireless device 10 is also configured to connect to at least one SCell in an unlicensed frequency band.

The wireless device 10 comprises a processing means 1620. e.g. one or more processors, configured to perform the methods herein.

The wireless device 10 may comprise a receiving module 1621. The wireless device 10, the processing means 1620 and/or the receiving module 1621 may be configured to receive information, in the scheduling grant of the uplink transmission, of at least one LBT parameter associated with the LBT procedure.

The wireless device 10 may comprise a performing module 1622. The wireless device 10, the processing means 1620 and/or the performing module 1622 may be configured to perform the LBT procedure using the at least one LBT parameter when transmitting data according to the received scheduling grant.

The wireless device 10, the processing means 1620 and/or the receiving module 1621 may be configured to receive the information by means of the common search space on the PDCCH or another downlink control channel, or receive the information in a broadcast.

The wireless device 10, the processing means 1620 and/or the receiving module 1621 may be configured to receive, from the scheduling node 12, the maximum transmission duration.

The wireless device 10, the processing means 1620 and/or the receiving module 1621 may be configured to further receive from the scheduling node 12, configuring information indicating different sets of LBT parameters.

The wireless device 10, the processing means 1620 and/or the performing module 1622 may be configured to change the at least one LBT parameter in consecutive LBT attempts for a particular transmission burst based on pre-defined rules, or pre-defined tables.

The wireless device 10, the processing means 1620 and/or the receiving module 1621 may be configured to further receive information which set to use by receiving via higher layer signalling or L1 signalling.

The wireless device 10, the processing means 1620 and/or the performing module 1622 may be configured to use a default set and only change the set when signalled to do so by RRC signalling or L1 signalling.

The wireless device 10 may comprise a resetting module 1623. The wireless device 10, the processing means 1620 and/or the resetting module 1623 may, when the at least one LBT parameter comprises the CW size, be configured to reset the CW size to a minimum value if some conditions are met.

The methods according to the embodiments described herein for the wireless device are respectively implemented by means of e.g. a computer program 1611 or a computer program product, comprising instructions, i.e., software code portions, which, when executed on at least one processor, cause the at least one processor to carry out the actions described herein, as performed by the wireless device. The computer program 1611 may be stored on a computer-readable storage medium 1612. e.g. a disc or similar. The computer-readable storage medium 1612, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

The wireless device 10 further comprises a memory 1610, communication unit 1630 and further functionality 1640. The memory comprises one or more units to be used to store data on, such as LBT parameters, scheduled resources, grants, transmit power, applications to perform the methods disclosed herein when being executed, and similar.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the scheduling node.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

According to an aspect a method performed by a scheduling node is provided for scheduling an uplink transmission from a wireless devices to the scheduling node. The scheduling node and the wireless device may support carrier aggregation, wherein the wireless device may be associated with the scheduling node by means of being connected to a Primary Cell, Pcell, in a licensed or unlicensed frequency band, the wireless device may also be connected to at least one Secondary Cell, SCell, in an unlicensed frequency band. The wireless device may also in this disclosure be referred to as a scheduled device, a UE, a device to be scheduled and/or a terminal.

The method may comprise determining/updating/adjusting at least one LBT parameter associated with a LBT procedure. The method may also comprise informing the wireless device about the determined/updated at least one LBT parameter.

In an example, the at least one LBT parameter is specific for the wireless device.

In another example, the at least one LBT parameter is common for a plurality of wireless devices that are associated with the scheduling node 12.

In yet another example, the scheduling node 12 may inform the wireless device of the determined/updated/adjusted at least one LBT parameter e.g. by means of a Downlink Control Information. DCI, of the scheduling grant.

In an example, the scheduling grant may comprise LBT parameter(s) relating to a single subframe or a burst of subframes.

In a further example, the single subframe or burst of subframes is to be transmitted on a single channel or across multiple channels.

Further, in an example, the scheduling node informs the device of the determined/updated at least one LBT parameter by means of a common search space on the Physical Downlink Control Channel, PDCCH, or another downlink control channel.

Still further, in another example, the scheduling node informs the device of the determined/updated at least one LBT parameter by means of broadcasting.

In an example, the method may further comprise signalling, to the device, a maximum transmission duration.

In another example, the method may further comprise further comprising determining a delay between a joint grant transmission and a first uplink subframe and scheduling multiple uplink subframes using the joint grant transmission, wherein the first uplink subframe is scheduled based on the determined delay.

In yet an example, the delay may be determined based on a downlink data buffer.

In a further example, the number of uplink subframes scheduled by means of the joint grant may be based on the uplink buffer of the device.

Further, in an example, determining/updating at least one LBT parameter may comprise determining at least two different sets of LBT parameters for the device to be used by the device in successive LBT attempts.

In yet an example, which set to be used by the device may be determined according to a predefined rule or predefined table.

In still another example, which set to be used by the device is signalled to the device.

Further, in an example, the at least one LBT parameter is one of, but not limited to, Contention Window (CW) size, length of defer period, random backoff counter, length of initial Clear Channel Assessment (CCA), duration of quick CCAs on channels other than the principal random backoff channel, rate of CW size adaptation, triggers to adapt CW size.

In yet an example, the determined/updated at least one LBT parameter may be the actual/absolute value of the LBT parameter(s) or an offset/differential to be added/subtracted to the current value of the LBT parameter(s).

The solution may have several advantages. One possible advantage is that the use of suboptimal LBT parameters at one or more devices may be avoided and their channel access probability may be improved. Yet another possible advantage is that successful multiplexing of multiple devices on the same uplink subframe on the same unlicensed band is enabled. Still another possible advantage is that improved coexistence between LAA/standalone LTE-U and WiFi in multi-carrier deployments is enabled. A further possible advantage is that improved coexistence between LAA/standalone LTE-U networks of different operators is enabled.

While the embodiments have been described in terms of several examples and embodiments, it is contemplated that alternatives, modifications, permutations and equivalents thereof may become apparent upon reading of the specifications and study of the drawings. Instead, the embodiments herein are limited only by the following claims and their legal equivalents.

What is claimed is:

1. A method performed by a network node of a wireless communication network, the method comprising:
   sending downlink control information (DCI) for a User Equipment (UE), the DCI indicating an uplink grant to schedule an uplink transmission by the UE in an unlicensed frequency band, where the UE will perform a Listen Before Talk (LBT) procedure in conjunction with performing the uplink transmission; and
   controlling the state of one bit in the DCI as a control bit, to control whether the UE resets a Contention Window (CW) size used by the UE for at least one LBT attempt performed by the UE in the LBT procedure.

2. The method of claim 1, wherein controlling the state of the control bit comprises controlling the state of the control bit to control whether the UE resets the CW size to a minimum size from a defined set of CW sizes or sets the CW size the next higher allowed value from the defined set of CW sizes.

3. The method of claim 1, wherein the uplink grant grants resources spanning longer than one subframe or longer than an allowed maximum transmission duration, and wherein network node controls the state of the control bit to cause the UE to reset the CW size for the at least one LBT attempt as a subsequent LBT attempt performed by the UE for the uplink grant, after an initial transmission.

4. The method of claim 1, wherein the network node is a radio network node in a Radio Access Network (RAN) portion of the wireless communication network, the radio network node responsible for scheduling uplink transmissions by the UE, and wherein sending the DCI comprises transmitting the DCI for reception by the UE.

5. The method of claim 1, wherein the uplink grant is a joint grant scheduling multiple uplink subframes for the UE, the joint grant determined in dependence on an uplink transmission buffer of the UE.

6. The method of claim 5, further comprising determining a first uplink subframe of the joint grant to account for a delay associated with performance by the UE of the LBT procedure before beginning the uplink transmission.

7. A network node configured for operation in a wireless communication network, the network node comprising:
  communication circuitry configured to communicate directly or indirectly with a User Equipment (UE); and
  processing circuitry operatively associated with the communication circuitry and configured to:
    send downlink control information (DCI) for a User Equipment (UE), the DCI indicating an uplink grant to schedule an uplink transmission by the UE in an unlicensed frequency band, where the UE will perform a Listen Before Talk (LBT) procedure in conjunction with performing the uplink transmission; and
    control the state of one bit in the DCI as a control bit, to control whether the UE resets a Contention Window (CW) size used by the UE for at least one LBT attempt performed by the UE in the LBT procedure.

8. The network node of claim 7, wherein the processing circuitry is configured to control the state of the control bit to control whether the UE resets the CW size to a minimum size from a defined set of CW sizes or sets the CW size the next higher allowed value from the defined set of CW sizes.

9. The network node of claim 7, wherein the uplink grant grants resources spanning longer than one subframe or longer than an allowed maximum transmission duration, and wherein the processing circuitry is configured to control the state of the control bit to cause the UE to reset the CW size for the at least one LBT attempt as a subsequent LBT attempt performed by the UE for the uplink grant, after an initial transmission.

10. The network node of claim 7, wherein the network node is a radio network node in a Radio Access Network (RAN) portion of the wireless communication network, the radio network node responsible for scheduling uplink transmissions by the UE, and wherein the processing circuitry is configured to send the DCI via transmission of the DCI by the communication circuitry of the network node, for reception by the UE.

11. The network node of claim 7, wherein the uplink grant is a joint grant scheduling multiple uplink subframes for the UE, and wherein the processing circuitry is configured to determine the joint grant in dependence on an uplink transmission buffer of the UE.

12. The network node of claim 11, wherein the processing circuitry is configured to determine a first uplink subframe of the joint grant to account for a delay associated with performance by the UE of the LBT procedure before beginning the uplink transmission.

13. A method of operation by a User Equipment (UE) configured for use with a wireless communication network, the method comprising:
  receiving downlink control information (DCI) that indicates an uplink grant to schedule an uplink transmission by the UE in an unlicensed frequency band, where the UE will perform a Listen Before Talk (LBT) procedure in conjunction with performing the uplink transmission; and
  determining whether to reset a Contention Window (CW) size used by the UE for at least one LBT attempt performed by the UE in the LBT procedure, in dependence on the state of one bit included in the DCI as a control bit.

14. The method of claim 13, wherein the uplink grant grants resources spanning longer than one subframe or longer than an allowed maximum transmission duration and the network node signals an offset relative to the uplink grant, and wherein, in dependence on the state of the control bit, the UE resets the CW size for the at least one LBT attempt as a first LBT attempt performed by the UE for the uplink grant, at or after the offset.

15. The method of claim 13, wherein, in dependence on the state of the control bit, the UE resets the CW size to a minimum size from a defined set of CW sizes or sets the CW size to a next higher allowed size from the defined set of CW sizes.

16. A User Equipment (UE) configured for use with a wireless communication network, the UE comprising:
  communication circuitry configured to wirelessly couple the UE to the wireless communication network; and
  processing circuitry operatively associated with the communication circuitry and configured to:
    receive, from a network node of the wireless communication network, downlink control information (DCI) that indicates an uplink grant to schedule an uplink transmission by the UE in an unlicensed frequency band, where the UE will perform a Listen Before Talk (LBT) procedure in conjunction with performing the uplink transmission; and
    determine whether to reset a Contention Window (CW) size used by the UE for at least one LBT attempt performed by the UE in the LBT procedure, in dependence on the state of one bit included in the DCI as a control bit.

17. The UE of claim 16, wherein the uplink grant grants resources spanning longer than one subframe or longer than an allowed maximum transmission duration and the network node signals an offset relative to the uplink grant, and wherein, in dependence on the state of the control bit, the processing circuitry is configured to reset the CW size for the at least one LBT attempt as a first LBT attempt performed by the UE for the uplink grant, at or after the offset.

18. The UE of claim 16, wherein the processing circuitry is configured to reset the CW size to a minimum size from a defined set of CW sizes or set the CW size to a next higher allowed size from the defined set of CW, in dependence on the state of the control bit.

* * * * *

UNITED STATES PATENT AND TRADEMARK OFFICE
CERTIFICATE OF CORRECTION

PATENT NO. : 11,729,814 B2
APPLICATION NO. : 17/340252
DATED : August 15, 2023
INVENTOR(S) : Mukherjee et al.

It is certified that error appears in the above-identified patent and that said Letters Patent is hereby corrected as shown below:

On the Title Page

Item (57), under "ABSTRACT", in Column 2, Line 8, delete "Talk." and insert -- Talk, --, therefor.

In the Drawings

In Fig. 15, Sheet 9 of 9, Tag "1508", Line 2, delete "prog.prod" and insert -- prog. prod --, therefor.

In the Specification

In Column 1, Line 6, delete "2016," and insert -- 2016, now Pat. No. 11,057,928, --, therefor.

In Column 1, Line 17, delete "(LTE). MulteFire." and insert -- (LTE), MulteFire, --, therefor.

In Column 2, Line 5, delete "networks." and insert -- networks, --, therefor.

In Column 2, Line 14, delete "spectrum." and insert -- spectrum, --, therefor.

In Column 2, Lines 45-46, delete "Tsubframe" and insert -- $T_{subframe}$ --, therefor.

In Column 2, Line 59, delete "scheduled." and insert -- scheduled, --, therefor.

In Column 3, Line 15, delete "requirement on" and insert -- requirement of --, therefor.

In Column 3, Line 50, delete "that the" and insert -- where the --, therefor.

In Column 4, Line 5, delete "Idle." and insert -- Idle, --, therefor.

In Column 4, Line 7, delete "Busy." and insert -- Busy, --, therefor.

Signed and Sealed this
Twelfth Day of December, 2023

*Katherine Kelly Vidal*

Katherine Kelly Vidal
*Director of the United States Patent and Trademark Office*

CERTIFICATE OF CORRECTION (continued)
U.S. Pat. No. 11,729,814 B2

In Column 4, Line 44, delete "Therefore." and insert -- Therefore, --, therefor.

In Column 5, Line 28, delete "Peell" and insert -- Pcell --, therefor.

In Column 5, Line 50, delete "updated." and insert -- updated, --, therefor.

In Column 7, Line 29, delete "(LAA)." and insert -- (LAA), --, therefor.

In Column 7, Line 30, delete "(WCDMA)." and insert -- (WCDMA), --, therefor.

In Column 7, Line 31, delete "(GSM/EDGE)." and insert -- (GSM/EDGE), --, therefor.

In Column 7, Line 36, delete "MulteFire." and insert -- MulteFire, --, therefor.

In Column 8, Line 9, delete "LTE." and insert -- LTE, --, therefor.

In Column 9, Line 37, delete "and to" and insert -- and --, therefor.

In Column 9, Line 67, delete "which set" and insert -- which is set --, therefor.

In Column 10, Line 14, delete "UL." and insert -- UL, --, therefor.

In Column 10, Line 22, delete "period." and insert -- period, --, therefor.

In Column 10, Line 24, delete "channels." and insert -- channels, --, therefor.

In Column 10, Line 64, delete "δ" and insert -- $\delta$ --, therefor.

In Column 10, Line 67, delete "S=4." and insert -- $\delta$=4. --, therefor.

In Column 11, Line 24, delete "reference" and insert -- Reference --, therefor.

In Column 12, Line 1, delete "10." and insert -- 10, --, therefor.

In Column 12, Line 52, delete "k" and insert -- k. --, therefor.

In Column 12, Line 54, delete "which set" and insert -- which is set --, therefor.

In Column 13, Line 34, delete "of be" and insert -- of --, therefor.

In Column 13, Line 48, delete "Peell" and insert -- Pcell --, therefor.

In Column 13, Line 63, delete "which set" and insert -- which is set --, therefor.

In Column 14, Line 26, delete "instructions." and insert -- instructions, --, therefor.

CERTIFICATE OF CORRECTION (continued)
U.S. Pat. No. 11,729,814 B2

In Column 14, Line 55, delete "and to" and insert -- and --, therefor.

In Column 15, Line 35, delete "hardware of" and insert -- hardware or --, therefor.

In Column 16, Line 39, delete "devices." and insert -- devices, --, therefor.

In Column 17, Line 7, delete "Processor." and insert -- Processor, --, therefor.

In Column 17, Line 31, delete "means in" and insert -- means that --, therefor.

In Column 17, Line 60, delete "1620." and insert -- 1620, --, therefor.

In Column 18, Line 27, delete "which set" and insert -- which is set --, therefor.

In Column 18, Line 47, delete "1612." and insert -- 1612, --, therefor.

In Column 19, Line 27, delete "Peell," and insert -- Pcell, --, therefor.

In Column 19, Line 47, delete "Information." and insert -- Information, --, therefor.

In Column 19, Lines 65-66, delete "further comprise further comprising" and insert -- further comprise --, therefor.

In the Claims

In Column 20, Line 66, in Claim 2, delete "size the" and insert -- size to the --, therefor.

In Column 21, Line 42, in Claim 8, delete "size the" and insert -- size to the --, therefor.